United States Patent
Schmidt et al.

(10) Patent No.: US 9,831,475 B2
(45) Date of Patent: Nov. 28, 2017

(54) METHOD FOR PRODUCING A BATTERY MODULE, AND BATTERY MODULE

(71) Applicant: Audi AG, Ingolstadt (DE)

(72) Inventors: Jörg Schmidt, Ingolstadt (DE); Erdal Acikgoez, Reichertshofen (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/024,761

(22) PCT Filed: Aug. 7, 2014

(86) PCT No.: PCT/EP2014/002174
§ 371 (c)(1),
(2) Date: Mar. 24, 2016

(87) PCT Pub. No.: WO2015/043701
PCT Pub. Date: Apr. 2, 2015

(65) Prior Publication Data
US 2016/0218328 A1  Jul. 28, 2016

(30) Foreign Application Priority Data

Sep. 27, 2013 (DE) .................. 10 2013 016 101

(51) Int. Cl.
*H01M 2/02* (2006.01)
*H01M 10/058* (2010.01)
(Continued)

(52) U.S. Cl.
CPC ....... *H01M 2/0242* (2013.01); *H01M 10/049* (2013.01); *H01M 10/058* (2013.01);
(Continued)

(58) Field of Classification Search
CPC .... H01M 2/02; H01M 10/04; H01M 10/0525; H01M 10/0587; H01M 2/0242; H01M 10/058; H01M 10/049; H01M 2220/20
See application file for complete search history.

(56) References Cited

U.S. PATENT DOCUMENTS

| 3,995,008 A | 11/1976 | Spiegelberg |
| 2012/0040222 A1* | 2/2012 | Quick ................. H01M 10/647 429/120 |

(Continued)

FOREIGN PATENT DOCUMENTS

| CN | 102931374 A | 2/2013 |
| DE | 72 31 595 | 2/1975 |

(Continued)

OTHER PUBLICATIONS

DE102007010751MT.*
(Continued)

*Primary Examiner* — Alex Usyatinsky
(74) *Attorney, Agent, or Firm* — Henry M. Feiereisen LLC

(57) ABSTRACT

In a method for producing a battery module having a plurality of battery cells, a module housing of the battery module is provided in a first step. A core assembly is introduced into the module housing, wherein a cavity, which is to be provided in a cured casting compound, is defined by a respective core of the core assembly. The casting compound is then introduced into the module housing. After the casting compound has been allowed to cure and the core assembly has been removed from the module housing, an electrode assembly, which is associated with the respective battery cell, is arranged in the cavity which is formed in the cured casting compound.

9 Claims, 2 Drawing Sheets

(51) Int. Cl.
*H01M 10/04* (2006.01)
*H01M 10/0525* (2010.01)
*H01M 10/0587* (2010.01)

(52) U.S. Cl.
CPC ... *H01M 10/0525* (2013.01); *H01M 10/0587* (2013.01); *H01M 2220/20* (2013.01)

(56) References Cited

U.S. PATENT DOCUMENTS

| 2013/0040178 A1* | 2/2013 | Lim | H01M 2/0242 |
| | | | 429/94 |
| 2013/0209851 A1* | 8/2013 | Gless | H01M 2/024 |
| | | | 429/99 |
| 2015/0028669 A1 | 1/2015 | Schmidt et al. | |

FOREIGN PATENT DOCUMENTS

| DE | 102007010742 | 8/2008 | |
| DE | 102007010751 | 8/2008 | |
| DE | 202010004637 | 10/2011 | |
| DE | 102010038862 | 2/2012 | |
| EP | 0 353 419 | 2/1990 | |
| GB | 1 416 680 | 12/1975 | |
| GB | 1416680 | * 12/1975 | ............. B29D 31/00 |
| WO | 2013/107625 | 7/2013 | |
| WO | WO 2013/107625 | 7/2013 | |

OTHER PUBLICATIONS

International Search Report issued by the European Patent Office in International Application PCT/EP2014/002174 dated Sep. 25, 2014.
Chinese Search Report issued by the Chinese Patent Office dated May 4, 2017 in Chinese Patent Application No. 2014800529808.
English translation of Chinese Search Report issued by the Chinese Patent Office dated May 4, 2017 in Chinese Patent Application No. 2014800529808.

* cited by examiner

METHOD FOR PRODUCING A BATTERY MODULE, AND BATTERY MODULE

CROSS-REFERENCES TO RELATED APPLICATIONS

This application is the U.S. National Stage of International Application No. PCT/EP2014/002174, filed Aug. 7, 2014, which designated the United States and has been published as International Publication No. WO 2015/043701 and which claims the priority of German Patent Application, Serial No. 10 2013 016 101.0, filed Sep. 27, 2013, pursuant to 35 U.S.C. 119(a)-(d).

BACKGROUND OF THE INVENTION

The invention relates to a method for producing a battery module having a plurality of battery cells. Furthermore, the invention relates to a battery module having a plurality of battery cells.

Battery modules are used to provide high-voltage batteries for electric vehicles and hybrid vehicles and include each a plurality of battery cells. Normally, the battery cells in such a battery module are electrically connected with each other and subjected to a compressive force which prevents bulging of walls of cell housings of the individual battery cells. In such battery modules, prismatic battery cells are oftentimes used and arranged side-by-side so as to be electrically connectable with one another in a simple manner. Since the prismatic battery cells usually have cell housings of metal, it is necessary to electrically insulate the battery cells from each other. In certain operating modes, provision is further made for a thermal insulation between the battery cells. Plastics are oftentimes used for electrical and thermal insulation.

When using plastic parts as separating elements between the individual battery cells, also referred to as spacers, many individual parts are required for the construction of battery modules with a plurality of battery cells. This is relatively complicated.

DE 10 2010 038 862 A1 describes a method for the production of a battery module, in which a plurality of battery cells are initially provided, and then the battery cells are electrically interconnected by cell connectors. Thereafter, a plastic housing of the battery module is manufactured by encapsulating the individual battery cells with plastic. As a result, gaps between the battery cells are filled with plastic using an injection molding process, and a sheath is produced which surrounds the battery cells in their entirety during the injection molding process. Thus, a single-piece plastic sheath is formed which delimits the battery module to the outside as housing. Only the connections or terminals of the battery module project out from the plastic sheath so as to be accessible from outside.

Such a method is difficult to implement, when the battery cells must be subjected to a compressive force in order to prevent bulging of the cell housings. In a situation in which the battery cells are pressed against each other, it is difficult to introduce plastic into the gaps between the battery cells. In addition, curing of the plastic material becomes difficult, as this requires long curing times. Heating for accelerating curing is not feasible, since the battery cells should not be exposed to a corresponding increase in temperature.

Furthermore, DE 20 2010 004 637 describes a lead-acid battery, as used as starter battery in motor vehicles. The lead-acid battery includes a plastic housing with several chambers which are formed or delimited by intermediate walls. Lead plates are arranged in the chambers as electrodes. Subsequently, the plastic housing is closed with a lid which is preferably formed as an injection-molded part. Electrolyte is then filled via feed openings, provided in the lid, into the battery so that it can be charged and discharged. Preferably, the housing and the lid are made of a pressure-resistant and impact-resistant plastic material, such as polypropylene.

SUMMARY OF THE INVENTION

Object of the present invention is to provide both an improved method for producing a battery module and an improved battery module.

According to one aspect of the invention, the object is attained by a method for producing a battery module having a plurality of battery cells, which method includes a plurality of steps. Initially, a module housing of the battery module is provided. A core assembly is placed in the module housing, with each core of the core assembly defining a cavity to be provided in a cured casting compound. Subsequently, the casting compound is introduced into the module housing. The casting compound is then allowed to cure. Thereafter, the core assembly is removed from the module housing. Finally, an electrode assembly, which is associated to the respective battery cell, is disposed in the cavity that has formed in the cured casting compound.

Advantageous embodiments with useful refinements of the invention are set forth in the dependent claims.

This is based on the recognition that aluminum typically used to form the housing of a battery cell can be replaced by plastic, with the walls to separate the battery cells from one another being formed by the cured casting compound. As a result, the need for the aluminum housing can be eliminated, resulting in cost benefits and weight benefits. In addition, the number of used components and manufacturing steps are significantly reduced in comparison to a method, in which the individual battery cells are compressed via interposition of plastic parts and arranged in a module housing.

Furthermore, the module housing to be provided anyway as form for pouring in the casting compound, forms then a boundary wall of the battery module. As the casting compound cures in the module housing, a particularly compact battery module can be provided, as the casting compound joins with the module housing.

Preferably, the module housing forms walls of the battery module to absorb forces applied by the electrode assemblies during operation of the battery. The electrode assemblies have a tendency to expand. The reason for this is the presence of electrochemical reactions encountered in the electrode assemblies during charging and discharging of the battery cells. When battery cells with aluminum housings are involved, the walls of the aluminum housing and a compressive force applied from outside upon a package of aluminum housings ensure that the walls cannot bulge.

In the present case, however, it is the module housing itself which prevents expansion of the electrode assemblies during operation. The module housing is designed sufficiently stable and solid, so as to be able to absorb the lateral forces encountered in the battery cells. Thus, a dimensional stability of the battery module is ensured, which is in particular of great importance when arranging the battery module in a vehicle.

A further advantage has been found, when the casting compound is heated and/or subjected to high-energy radiation, as it is allowed to cure. Such methods for accelerating curing of the casting compound can now easily be used, since the sensitive electrode assemblies are not yet located in the cavities to be formed in the casting compound.

Furthermore, as the casting compound is allowed to cure, it can be subjected to mechanical stress to impart the desired properties. Also exposure to such mechanical stress is limited in a situation in which the electrode assemblies have already been placed in the cavities.

According to a further advantageous configuration of the invention, at least one lid element, connected to the electrode assembly, closes the cavity receiving the electrode assembly. Thus, the electrode assembly is well shielded from external impacts. In addition, the realization of a cell housing, formed by the cured casting compound in cooperation with the lid element, for each battery cell is particularly easy and economical to accomplish.

A reliable sealing of the respective battery cells can be realized, when the lid element is bonded and/or welded to the walls that are formed by the cured casting compound and delimit the respective battery cells from one another. In particular, when using a heat-curable thermosetting plastic as casting compound, bonding of the lid element with the walls has been found to be beneficial. Conversely, when using a thermoplastic material as casting compound, welding also enables particularly well a realization of a hermetically sealed connection between the lid element and the walls.

It is furthermore advantageous, when an electrolyte is introduced into the respective battery cell after the electrode assembly has been arranged in the cavity. This is based on the recognition that the tendency of the electrode assembly to expand is established only as a result of chemical reactions, for which the electrolyte has to be present in the battery cells. By filling the electrolyte into the respective battery cell only after arrangement of the electrode assembly in the respective cavity, the electrode assembly can therefore be introduced into the cavities in a particular reliable manner.

Preferably, the electrode assembly is formed by a coil and/or a package of diverter elements coated with anode material and cathode material, and the anode material is formed by separators that separate it from the cathode material. Such coils or packages represent a particularly large chemically active surface with compact dimensions. The package can have for this purpose folds in particular.

Finally, it has proven to be advantageous, when a lithium-ion battery is formed by the battery module. Accordingly, the individual battery cells are designed as lithium-ion cells, as used in particular for battery modules of high-voltage batteries for electric vehicles and hybrid vehicles. Such a battery module is capable to provide high voltages and high currents, while keeping weight comparably low.

According to another aspect of the invention, the object is attained by a battery module, which includes a plurality of battery cells and a module housing which receives a cured casting compound. Arranged in receiving spaces formed by the cured casting compound is hereby an electrode assembly associated to the respective battery cell. Such a battery module is characterized by a particularly simple production with a small number of parts.

The advantages described for the method according to the invention and preferred embodiments also apply to the battery module according to the invention, and vice versa.

Features and feature combinations as mentioned in the description above, and the features and feature combinations mentioned hereinafter in the description of the figures and/or shown alone in the figures, are applicable not only in the particular combination indicated but also in other combinations or alone, without departing the scope the invention. Thus, also configurations are included by the invention and considered as disclosed, which are not explicitly shown or described in the figures, but follow and can be realized through separated feature combinations from the described embodiments.

BRIEF DESCRIPTION OF THE DRAWING

Further advantages, features and details of the invention become apparent from the claims, the following description of preferred embodiments, and with reference to the drawings. It is shown in:

DETAILED DESCRIPTION OF PREFERRED EMBODIMENTS

Figure 1:
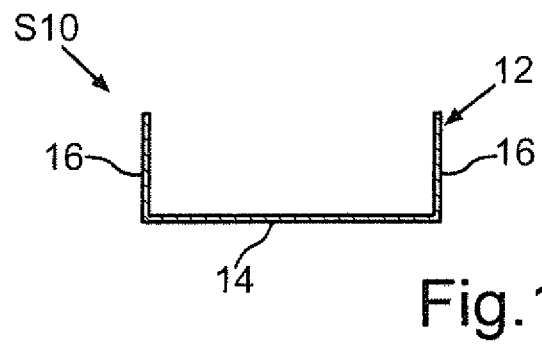
FIG. 1 a first step in the production of a battery module in which an empty module housing of the battery module is provided.
Figure 7:
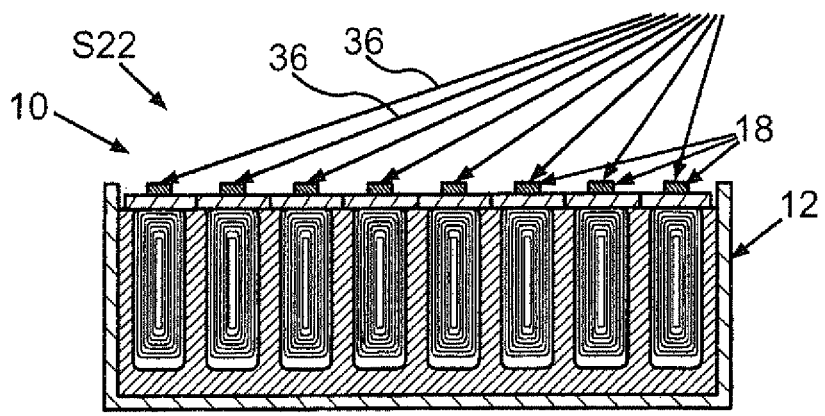
FIG. 7 the filling of the individual battery cells of the battery module with an electrolyte.

With reference to FIG. 1, a first step S10 can be exemplified in the production of a battery module 10 shown in FIG. 7 in the final state. In the first step S10, an empty module housing 12 is provided, which has here a bottom 14 and side walls 16. This module housing 12 forms a wall of the finished battery module 10 (see FIG. 7). The module housing 12 is sufficiently stable so as to be able to absorb forces encountered in the battery module 10. These forces, which act in particular on the side walls 16 of the module housing 12, are caused by the chemical reactions which take place in individual battery cells 18 of the battery module 10, when the battery module 10 provides a voltage.

Figure 2:
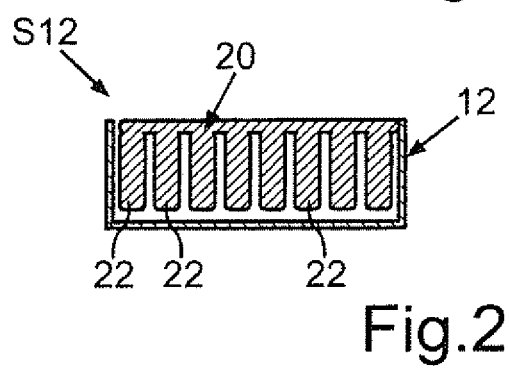
FIG. 2 the placement of a core assembly into the module housing, with cores of the core assembly defining cavities in a plastic part to be produced.

In a second step S12 (see FIG. 2), a core assembly 20 is placed in the module housing 12 and includes a multiplicity of cores 22. These cores 22 provide the negative form of electrode assemblies 24 of the individual battery cells 18 (see FIG. 6).

Figure 3:
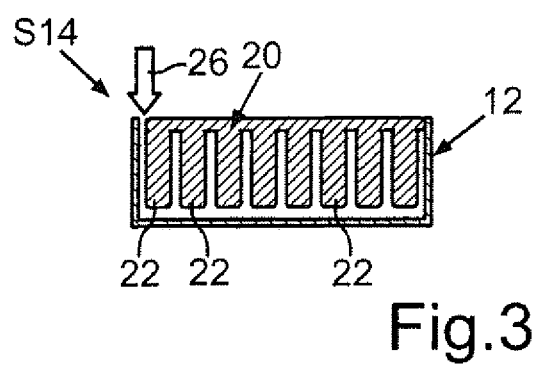
FIG. 3 the pouring of a casting compound into the module housing with accommodated core assembly.

In a next step S14 (see FIG. 3), a casting compound 26 is poured into the module housing 12, while the core assembly 20 remains in the module housing 12. The casting compound 26 is formed by a plastic, which fills the cavities, not occupied by the core assembly 20 and in particular by the cores 22, in the module housing 12.

Subsequently, the casting compound 26 is allowed to cure. In view of the absence of electrode assemblies 24 in the cavities that are left behind by the cores 22 in the cured casting compound 26, processes can find application, when the casting compound 26 is allowed to cure, that are incompatible for the electrode assemblies 24. For example, curing of the casting compound 26 can thus be accelerated by increasing the temperature or introduction of energy-rich radiation.

Figure 4:
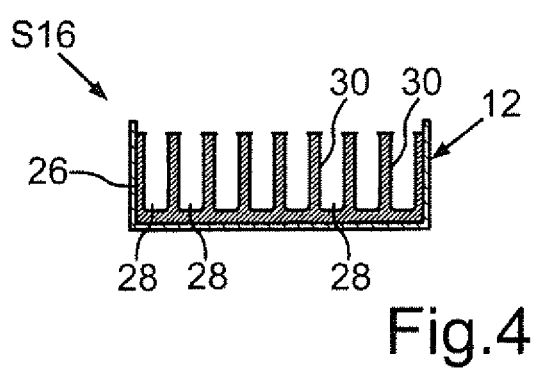
FIG. 4 the cured casting compound in the module housing to form the plastic part.

After the casting compound 26 has cured, the core assembly 20 is removed from the module housing 12 (see step S16 in FIG. 4). Thus, the cavities 28 remain in the cured casting compound 26 for the electrode assemblies 24, which correspond in shape and dimensions to those of the cores 22 of the core assembly 20. The cured casting compound 26 thus forms walls 30, which in the finished battery module 10 separate the individual battery cells 18 from one another (see FIG. 7).

The module housing 12 thus forms not only outer walls of the battery module 10, but provides at the same time the mold, in which the casting compound 26 is poured. As it cures, the casting compound 26 is joined with the module housing 12.

Figure 5:
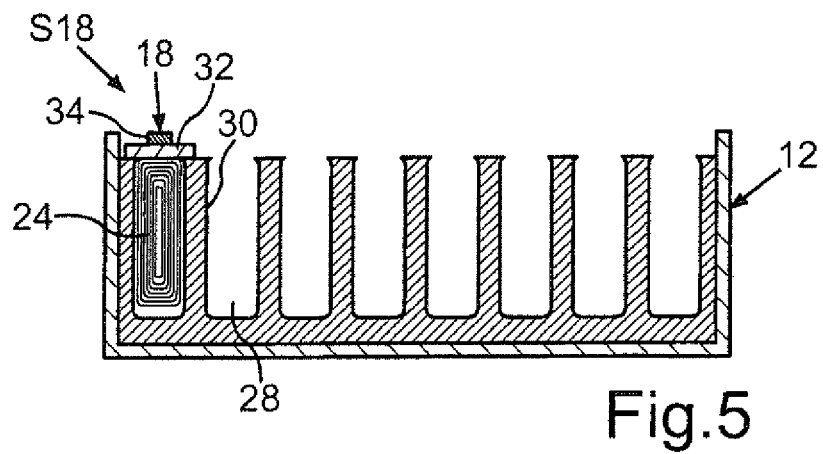
FIG. 5 the insertion of a cell coil with lid and electric pole in a cavity provided in the cured casting compound.

In a next step S18, illustrated in FIG. 5, the electrode assemblies 24 are placed into the respective cavities 28. The electrode assemblies 24 include, when the battery cell 18 is formed as lithium-ion cell, respective conductor sheets which are coated with the chemically active material of the anode and the cathode, with an electrically insulating separator being disposed between the cathode material and the anode material. Since the electrodes are wound or folded in this electrode assembly, such an electrode assembly 24 is also referred to as cell coil or cell package.

Each electrode assembly 24 is connected here also to a lid 32. Protruding from this lid 32 are the electric poles 34 of the respective battery cell 18. By interconnecting the electric poles 34, of which FIG. 5 shows only one schematically, the amperage, provided by the battery module 10 and the voltage provided by the battery module 10 can be adjusted as desired. Thus, several battery modules 10 can be used to form, for example, vehicle batteries for electric vehicles and hybrid vehicles, which are configured as high-voltage batteries. The cavity 28 is closed, after insertion of the electrode assembly 24 into the cavity 28, by bonding or welding the lid 32 to the walls 30 which separate the battery cells 18 from each other.

Figure 6:
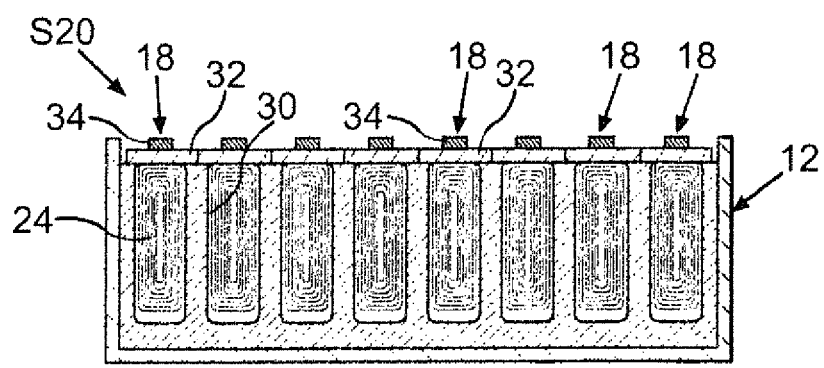
FIG. 6 the battery module after introduction of the other cell coils with respective lid in the other cavities.

FIG. 6 depicts a further step S20 in the manufacture of the battery module 10, wherein all lids 32 close the respective cavities 28. Accordingly, the individual lids 32 of the respective battery cells 18 form a more or less continuous lid unit, from which only the poles 34 of the individual battery cells 18 protrude.

Referring to FIG. 7, there is shown a further step S22 in which an electrolyte 36 is introduced through corresponding fill openings, provided in each lid 32, into the respective battery cell 18. Only after filling the battery cells 18 with the electrolyte 36 is it possible for electrochemical reactions to occur in order to ensure that the battery module 10 is able to store electric energy and to release it. After the battery cells 18 have been filled with the electrolyte 36, also lateral forces build up in the battery cells 18 and are absorbed by the module housing 12 of the battery module 10.

The invention claimed is:

1. A method for producing a battery module, comprising:
   introducing a core assembly in a module housing;
   pouring a casting compound into the module housing;
   heating and/or subjecting to high-energy radiation and/or exposing to mechanical stress, as the casting compound is allowed to cure;
   removing the core assembly from the module housing so that each core of the core assembly leaves behind a cavity in the cured casting compound;
   placing an electrode assembly in the cavity, thereby defining a battery cell, with the casting compound forming a delimiting wall of the battery cell associated to the electrode assembly.

2. The method of claim 1, wherein the module housing forms walls of the battery module to absorb forces applied by the electrode assemblies during operation of the battery module.

3. The method of claim 1, further comprising connecting at least one lid element to the electrode assembly for closing the cavity which receives the electrode assembly.

4. The method of claim 3, wherein the lid element is bonded and/or welded to the wall formed by the cured casting compound and separating the battery cell from another battery cell.

5. The method of claim 1, further comprising placing an electrolyte into the battery cell after the electrode assembly has been placed in the cavity.

6. The method of claim 1, wherein the electrode assembly is formed by a coil and/or a package of conductor elements coated with anode material and cathode material, with the anode material being separated from the cathode material by separators.

7. The method of claim 6, wherein the package has folds.

8. The method of claim 1, wherein the battery module forms a lithium-ion battery.

9. A battery module produced by the method of claim 1 comprising:
   a plurality of battery cells, each having an electrode assembly in the form of a coil and/or a package of conductor sheets coated with a cathode material and an anode material, with the anode material being separated from the cathode material by electrically insulating separators;
   a module housing; and
   a cured casting compound made of plastic and received in the module housing, said casting compound having receiving spaces configured to receive the electrode assemblies in one-to-one correspondence and forming a delimiting wall of each of the battery cells.

* * * * *